United States Patent Office 2,938,901
Patented May 31, 1960

2,938,901

SURGICAL DUSTING POWDER AND PROCESS THEREFOR

Ralph W. Kerr, Riverside, and Frank C. Cleveland, Jr., Chicago, Ill., assignors to Corn Products Company, a corporation of Delaware No Drawing. Original application Aug. 6, 1954, Ser. No. 448,359, now Patent No. 2,801,242, dated July 30, 1957. Divided and this application Nov. 23, 1956, Ser. No. 623,806

2 Claims. (Cl. 260—233.5)

This invention relates to the preparation of starch phosphate esters wherein the colloidal properties of the starch have been altered primarily by the introduction of distarch phosphate groups, i.e., phosphate cross-linkages, as contrasted to simple monostarch phosphate ester groups. More particularly the invention relates to a process of preparing distarch phosphate esters which retain the granule form of the starch and may be used as surgical dusting powders.

Starch phosphate esters which are cross-linked have unusual properties which make them suitable for a number of industrial uses. They are more resistant to gelatinization and pastes made therefrom have increased stability as concerns breakdown by heating compared to untreated starch. In fact, depending upon the degree of cross-linking, starch esters may be prepared which are nongelatinizable in boiling water.

In our copending application Serial No. 576,524, filed April 6, now Patent No. 2,884,413, which is a continuation-in-part of Serial No. 388,914, filed October 28, 1953, now abandoned, there are described and claimed methods for making phosphate esters by heating starch in semidry form with salts of anhydro forms of phosphoric acid, such as metaphosphate, polymetaphosphates, pyrophosphates and polyphoshates. After cooling, the starch phosphate is washed to remove impurities. Depending upon conditions, several types of products result: (1) monostarch phosphate, (2) distarch phosphates, and (3) monostarch phosphates wherein there is also an appreciable percentage of distarch phosphate groups.

The methods referred to above possess the inherent disadvantage that in order to remove unreacted salts and by-products an extensive washing step after the drying reaction and an additional drying step are necessary. Rewashing and redrying are not only cumbersome operations in starch manufacturing plants but are also relatively costly.

It is an object of this invention to provide a new and novel process for the production of distarch phosphate esters in granule form. Other objects will appear hereinafter.

We have discovered that distarch phosphate in granule form may be produced by heating an aqueous slurry of ungelatinized starch with a water soluble metaphosphate salt at a temperature sufficiently low to maintain the starch in the unswollen granule state, the pH of the system being preferably at least about 9.0.

The reaction between a starch and a metaphosphate salt is understood to proceed as follows using sodium trimetaphosphate as an example:

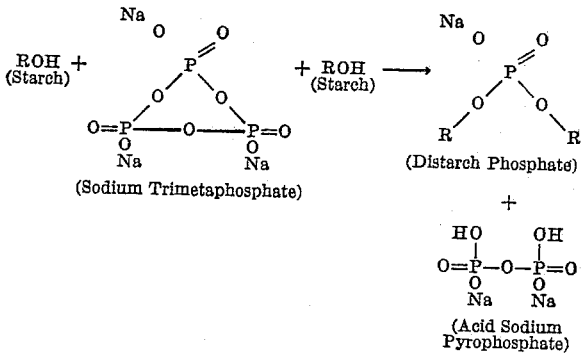

Under certain conditions some monostarch phosphate groups may also be produced but, if so, the amount will be negligible.

The obvious changes accompanying a starch cross-linking reaction are as follows:[1] In the early stages of the reaction, the paste viscosity of the starch increases significantly. In contrast to simple esterification, however, which also may produce increased paste viscosity, clarity of the cross-linked starch paste does not increase in proportion. Also in contrast to simple esterification, the paste of cross-linked cereal starches become "shorter" and more salve-like (or less cohesive). The opposite is true in simple esterification, after which the pastes have higher clarity and "longer" flow.

As the cross-linking reaction progresses, viscosity reaches a peak and then declines to very low values; simultaneously shortness and opacity increase. (Clarity decreases.) This is due to a progressive decrease in the ability of starch substance to disperse in water as it becomes progressively more cross-linked. However, in these more advanced stages of cross-linking of starch in granule form, the starch may develop relatively high and stable viscosities if gelatinization conditions are made more strenuous such, as for example, greatly prolonging the cooking time, using autoclave temperatures or adding starch dispersing agents, such as alkali, acid or sugars. Technically, these are important characteristics in that more rugged starches are produced which are stabilized to breakdown by conditions employed by those who use the starch. For example, the relatively tender waxy starches, such as waxy maize, or the noncereal starches, such as tapioca, which rapidly deteriorate on cooking in many uses to a thin, slimy paste, may be stabilized by the correct amount of cross-linking so that they actually increase in viscosity as cooking time is extended. Moreover, the cohesiveness of these gels is reduced to a more palatable texture. The same may be said for certain derivatives of the cereal starches, such as corn monostarch phosphates (like the potato and tapioca starches they so strongly resemble). They also tend to deteriorate on prolonged cooking or at autoclave temperatures or under other adverse conditions more readily than untreated cereal starch. A definite amount of cross-linking

[1] See: Kerr, Chemistry and Industry of Starch, 2nd ed., page 470.

converts corn monostarch phosphate into a product quite similar to a cross-linked waxy starch. This is an important development in that some of the undesirable characteristics of starches, such as corn starch, can be changed to desirable characteristics. Finally, in the last stages of cross-linking, the starch becomes insolubilized. Starch in the granule state containing a sufficient number of distarch phosphate groups will not gelatinize even when boiled in water. Such a product may be used as an inert dusting powder, unaffected by moisture or temperature, such as is used in steam sterilization. The product may, accordingly, be used for dusting and lubrication of surgeon's gloves which may be sterilized in the autoclave and the starch will not lose its lubricating or detackifying effect.

The process of the present invention is simple and accordingly can be carried out with no difficulty. A slurry of ungelatinized starch in water containing the requisite amount of metaphosphate and having a suitable pH is heated with agitation at a temperature sufficiently low to maintain the starch in the unswollen granule state. In general, temperatures between 40° C. and 50° C. are satisfactory but higher or lower temperatures may be used depending on alkalinity and whether a gelatinization inhibitor is used. After the reaction has proceeded to the desired degree, the resultant distarch phosphate is filtered, washed, the pH adjusted and the product dried.

The invention is applicable to all varieties of raw starch, e.g., corn, tapioca, wheat, waxy sorghum, grain sorghum and the like. Further, the invention is applicable to various modified starches and derivatives of starch, e.g., thin boiling starches, oxidized starches, starch ethers, starch esters and the like. The term "starch," as used in the claims, is intended to include all of the above listed substances.

As previously mentioned, the phosphorylating agents are the water soluble metaphosphates and polymetaphosphates and of these sodium trimetaphosphate is the preferred reagent. Although some commercial samples of other phosphates, e.g., sodium tripolyphosphate produced an appreciable degree of esterification of starch in aqueous slurry, others did not, and it is thought that metaphosphate impurities were responsible for the esterification in the former case. The pyrophosphates appear to give very little, if any, reaction with starch in the wet state.

The phosphorylation of starch in accordance with the present invention proceeds more efficiently at a high pH, preferably at 11.0 or above although a pH of about 9.0 is satisfactory. Various alkaline materials, e.g., sodium hydroxide, sodium carbonate, lime, and the like may be used to make the pH adjustment.

The amount of metaphosphate required to produce cross-linking sufficient to show an increase in the viscosity of starch is quite small, i.e., of the order of about 0.03 percent, based on the dry weight of the starch, when the time of the reaction is one hour, the temperature 50° C., and the pH 11. Under these same conditions of time, temperature and pH, about 0.6 percent of metaphosphate will make the starch nongelatinizable in boiling water. Although amounts higher than about 0.6 percent are not detrimental for these conditions, such amounts serve no useful purpose. The reaction proceeds faster with increased temperature, and pH, and with increased amount of metaphosphate up to the point where the starch becomes nongelatinizable. If temperatures below 50° C. are used, it is obvious that correspondingly more metaphosphate should be used if time and pH are the same. A practical operating range of metaphosphate is about 0.01 to about 3 percent.

It has been found that the concentration of sodium added as a sodium salt has an effect on the degree of phosphorylation obtained within a given time, the higher the concentration (within practical limits) the higher the degree of phosphorylation. A total sodium ion concentration of about 0.4 mole per liter gives satisfactory results.

The following examples, which are intended as typical and informative and in no way limiting the invention, will further illustrate the invention.

EXAMPLE 1

Production of high viscosity, partially cross-linked corn starch: the effect of time on the reaction between starch and sodium trimetaphosphate in aqueous slurry at pH 10.2 and 50° C.

One mole of corn starch (180 grams at 10 percent moisture content) was suspended in 325 ml. of water into which had been dissolved 3.3 grams of commercial sodium trimetaphosphate (Victor Chemical Company) and sufficient sodium carbonate buffer (5.45 grams) to adjust the pH of the starch slurry to 10.2. The slurry was heated to 50° C. with stirring and held at this reaction temperature. Samples were removed at intervals shown in Table I, filtered, washed and adjusted to pH 6.7 with hydrochloric acid and dried.

Scott viscosity tests were made on these samples in accordance with procedures described in Kerr, Chemistry and Industry of Starch, 2nd edition, pp. 119–121. Results were as follows:

Table I

REACTION OF CORN STARCH WITH SODIUM TRIMETAPHOSPHATE (2%) IN AQUEOUS SLURRY AT pH 10.2 AND 50° C.

| Reaction time, min.: | Scott viscosity[1], sec./50 ml. |
|---|---|
| 0 (untreated) | 93 |
| 40 | 105 |
| 50 | 147 |
| 60 | 131 |
| 70 | 103 |
| 80 | 90 |

[1] Unless otherwise specified, viscosity tests were run using 15 grams of starch at 12 percent moisture content in 280 ml. water.

The viscosity of the heat gelatinized samples increased to a maximum in about 50 minutes reaction time and then decreased as the cross-linking reaction continued. A sample taken from the reaction mixture after 24 hours would not gelatinize when boiled in water.

The high viscosity sample taken after 50 minutes reaction time formed a paste which was more opaque and less cohesive than untreated corn starch and by analysis had a phosphorus content of 0.03 percent. This starch when made into adhesive formulations suitable for pasting paper products, such as paper bags or corrugated paper board, gave higher bodied pastes which permitted the use of greater dilutions than untreated corn starch; moreover, the cross-linked starch paste had better stability with use, that is, maintained its viscosity with time and agitation better than untreated corn starch.

EXAMPLE 2

Procedures given in Example 1 were repeated with the exception that only one gram of sodium trimetaphosphate was used per 180 grams of corn starch (at 10 percent moisture content) and 6.65 grams of sodium carbonate was added.

Samples were removed at time intervals shown in Table II, washed, neutralized and dried. Paste clarity of pastes made from these samples was determined as follows: A slurry of the starch product in water is adjusted to pH 6.5 and at about 1 percent concentration. The flask is then immersed in boiling water for 30 minutes with occasional stirring, then cooled to 25° C. and adjusted in volume so as to contain 1 gram starch per 100 ml. At 25° C., the paste is introduced into a 13 mm. cell of a Coleman spectrophotometer, the light wave adjusted to $\lambda = 650$ m$\mu$ and the percent light transmission determined, using distilled water as reference for 100 percent light transmission.

Table II
REACTION OF SODIUM TRIMETAPHOSPHATE WITH CORN STARCH (ONE GRAM/180 GRAMS) IN AQUEOUS SLURRY AT pH 10.2 AND 50° C.

| Reaction Time, Min. | Scott Viscosity, Sec./50 ml. | Clarity of 1% Pastes As Percent Light Transmission at λ=650 mμ |
|---|---|---|
| 0 (untreated) | 93 | 20 |
| 45 | 106 | |
| 60 | 118 | 22 |
| 80 | 172 | |
| 100 | 140 | 19 |
| 120 | 96 | 18 |
| 180 | 34 | 15 |
| 240 | 23 | 13.5 |
| 1,440 | 11 | 7 |

Again it will be observed that the Scott viscosity of the products increased to a maximum and then declined. Clarity of pastes, in general, declined as cross-linking progressed. The effect of lower concentration of sodium trimetaphosphate under these conditions was to retard the esterification so that now the peak viscosity starch phosphate was not obtained until approximately 80 minutes reaction time.

EXAMPLE 3

The effect of lower trimetaphosphate concentration in aqueous starch slurries at the higher pH value of 11 and at 50° C.

Even still lower trimetaphosphate concentrations than used in Examples 1 and 2 were found to be effective in producing all degrees of cross-linking in corn starch. However, the reaction was accelerated by using the higher pH value of 11 in this experiment.

One molar weight of corn starch was stirred into 220 ml. of water into which had been dissolved 4.52 grams of sodium carbonate and the amounts of sodium trimetaphosphate shown in Table III. Just prior to adding the starch, 4 ml. of 10 N sodium hydroxide was stirred into the reaction solution. The pH value of the slurry was 11. The reaction mixture was held at 50° C. for one hour then cooled to room temperature, adjusted to pH 6.5 with hydrochloric acid, washed and dried. A series of such reactions was run using varying amounts of sodium trimetaphosphate between 0.05 and 1.0 gram. The Scott viscosities of these products are shown in Table III.

It will be observed from the results in Table II that at pH 11 and 50° C. as little as 0.15 gram of sodium trimetaphosphate per 180 grams corn starch at 10 percent moisture content produced a peak Scott viscosity starch product within one hour by the aqueous slurry method.

Under these conditions also, as little as 0.75 to 1.0 gram of sodium trimetaphosphate produced a starch product so completely cross-linked that when it was held in boiling water bath for 15 minutes, it had no Scott viscosity that could not be accounted for by 15 grams of unswollen

Table III
EFFECT OF LOWER TRIMETAPHOSPHATE CONCENTRATIONS ON AQUEOUS SLURRIES OF STARCH AT pH 11 (50° C. FOR ONE HOUR)

| Sodium Trimetaphosphate Added Per 180 g. Corn Starch, Grams | Scott Viscosity, Sec./50 ml. | Stormer Test, Sec./50 Rev. |
|---|---|---|
| 0 (untreated) | 94 | Gel. |
| 0.05 | 120 | Too thick. |
| 0.10 | 154 | Do. |
| 0.15 | 190 | 495. |
| 0.175 | 109 | 102. |
| 0.20 | 94 | 67. |
| 0.25 | 47 | 41. |
| 0.50 | 18 | |
| 0.75 | 13 | |
| 1.00 | 12 | 3. | starch granules in 280 ml. of water. Water alone gives a Scott viscosity of 11 seconds.

This example illustrates additionally the higher reaction rate at pH 11 than was obtained at pH 10.2 in Examples 1 and 2.

Pastes of several of the products used for Scott viscosity were cooled to 25° C. and after one hour at this temperature were placed in the cup of a Stormer viscometer. A 175 gram weight was used to actuate the spindle and the seconds noted for 50 revolutions. As indicated in Table III pastes made from untreated corn starch set to a rigid gel after one hour and pastes from starch treated with 0.05 and 0.10 gram of trimetaphosphate, were too thick to measure by this test. The peak Scott test starch however was fluid, although quite thick and relatively short in body. As the concentration of trimetaphosphate used was increased, cold paste body at one hour decreased until finally only a watery suspension was obtained. As the extent of cross-linking was increased the cold pastes became increasingly less cohesive and salve-like.

EXAMPLE 4

Effect of added cation on the reaction between trimetaphosphate and starch in aqueous slurry.

The equation given for this reaction between starch and trimetaphosphate indicates that acid groups (acid sodium pyrophosphate) are produced during the reaction. Since the reaction proceeds more readily at higher pH values, one function of the added carbonate in Examples 1 to 3 is to act as buffer. However, the added sodium also appears to act beneficially on the phosphorylation as well. If sufficient alkali is added to maintain a high pH value then on a molar basis, sodium in NaCl is as effective as in $Na_2CO_3$.

Three reaction mixtures were set up as follows: 180 grams of corn starch (at 10 percent moisture content) was stirred in 320 ml. of water into which had been dissolved one gram of sodium trimetaphosphate and 4 ml. of 10 N NaOH. To one, 4.52 grams of $Na_2CO_3$ was also included and to a second, 5 grams of NaCl had been added; the third contained no further additions. All three were stirred for 2 hours at 50° C., then cooled, neutralized with HCl, washed with water and dried.

Data on these products are shown in Table IV.

Table IV
EFFECT OF SODIUM CONCENTRATION ON THE REACTION BETWEEN STARCH AND TRIMETAPHOSPHATE

| Additions of Sodium in Moles × 10⁻³/100 ml. from— | | | | Total Sodium Concentration in Moles × 10⁻³ Per 100 ml. | Scott Vis., Sec./50 ml. | Stormer Test, Sec./50 Rev. |
|---|---|---|---|---|---|---|
| $(NaPO_3)_3$ | NaOH | NaCl | $Na_2CO_3$ | | | |
| 2.9 | 11.7 | | 25.0 | 39.6 | 13 | 3.5 |
| 2.9 | 11.7 | 25.0 | | 39.6 | 12 | 3.0 |
| 2.9 | 11.7 | | | 14.6 | 120 | 850 |

In all cases during these reactions, the alkalinity was within the range pH 11.2 to 11.6. Actually, the pH value of the reaction mixture containing only NaOH and the trimetaphosphate was slightly higher than the others. Nevertheless at the end of 2 hours, the cross-linking reaction in this case had only advanced to the region of a super-viscosity starch whereas, with either sodium carbonate or sodium chloride added, the cross-linking reaction had proceeded to the stage where the starch was substantially ungelatinized by the Scott viscosity cooking procedure.

EXAMPLE 5

Use of lime as catalyst instead of sodium hydroxide and carbonate to produce a peak Scott viscosity corn starch diphosphate.

One molar weight of corn starch was stirred into 255 ml. of water into which had been dissolved 2.37 grams of commercial calcium hydroxide (assay 93 percent) and 0.81 gram of sodium trimetaphosphate. The slurry was stirred for 2 hours at 45° C. and then cooled to room temperature. The pH was 11.5.

The slurry was filtered, washed with water and adjusted to pH 6.2 with hydrochloric acid.

A high viscosity, partially cross-linked starch resulted having a Scott viscosity test of 150 seconds per 50 ml.

EXAMPLE 6

Production of a nongelatinizable, mobile dusting powder.

1100 grams of corn starch was stirred into 1300 ml. of water into which had been dissolved 33 grams of sodium trimetaphosphate, 30 grams of sodium carbonate, and 11 grams of sodium hydroxide. The pH value was 11.2. This slurry was stirred at 50° C. for 24 hours.

At the end of this time, the slurry was cooled to room temperature and a portion (part A) was removed, adjusted to pH 6.5 with hydrochloric acid, thoroughly washed in water and dried.

During purification of the balance (part B) of the reaction mixture sufficient calcium chloride was added so that when washing of the product was terminated and the product dried, the starch powder contained an amount of calcium equivalent to 0.25 percent calcium phosphate.

This dry starch powder was found to be very mobile and useable as a dusting powder, particularly as a surgical rubber dusting powder, because of its great resistance to gelatinization, as shown below; surgical rubber gloves are sterilized before use by steam autoclaving and accordingly any dusting powder used on the gloves must withstand steam sterilization.

Both starch products made in this example were treated as follows: 5 grams of product was stirred into 100 ml. of water and heated in a boiling water bath for 20 minutes. The heated mixture was adjusted to 100 ml. in volume and poured into a 100 ml. graduated cylinder. After 24 hours at room temperature, it was noted that substantially all of the starch had settled out. The volume of sedimented starch was noted and is shown below. Two other commercial starch products sold under the trademarks Biosorb and Vulca-100, as nongelatinizing products were tested in comparison.

Table V

| Sample | Percent Calcium Phosphate | pH Value of Heated Aqueous Suspension | Gelatinization Test, ml. of Starch Sediment |
|---|---|---|---|
| Example 6-A | 0 | 7.1 | 19 |
| Example 6-B | 0.25 | 7.2 | 22 |
| Vulca-100 | | | 20 |
| Biosorb | | | 32 |
| Untreated Corn Starch | 0 | 7.0 | 100 |

EXAMPLE 7

Effect of pH value on the reaction of starch in aqueous slurry with sodium trimetaphosphate.

Procedures, substantially the same as given in Example 2, were repeated with the exception that either sufficient sodium hydroxide or hydrochloric acid was incorporated into the formulation to give reaction pH values of approximately 11, 9 and 8, instead of the pH value of approximately 10, used in Example 2. Below in Table VI are the results of these experiments compared to those of Example 2, using Scott test as a measure of reaction.

Table VI

REACTION OF AQUEOUS SLURRIES OF CORN STARCH WITH SODIUM TRIMETAPHOSPHATE AT 50° C. AND AT pH VALUES OF 8, 9, 10 AND 11

| Reaction Time, Min. | Scott Viscosity Values of Products From Reactions at pH Values | | | |
|---|---|---|---|---|
| | pH 8 | pH 9 | pH 10 | pH 11 |
| 0 (untreated) | 93 | 93 | 93 | 93 |
| 5 | | | | 119 |
| 30 | | | | 38 |
| 45 | | | 106 | 28 |
| 60 | | | 118 | 20 |
| 80 | | | 172 | 16 |
| 100 | 93 | 100 | 140 | |
| 120 | | 100 | 96 | 13 |
| 180 | 93 | 107 | 34 | |
| 240 | 90 | 112 | 23 | |
| 300 | 92 | 108 | 19 | |
| 1,440 | 134 | 49 | 11 | |
| 2,880 | | 17 | | |

The results show the great retardation in rate of cross-linking by trimetaphosphate when the pH value is lowered over the range from 11 to 8. Whereas at pH 11, the peak viscosity occurred within the first 5 minutes, at pH 10 the time was about 80 minutes, for pH 9 sometime after 180 minutes and at pH 8 sometime after 24 hours. Extensive cross-linking (Scott values less than 20) requires less than 2 hours at pH 11, 5 hours at pH 10; about 48 hours at pH 9 and may not occur at all at pH 8, since the reagent is hydrolyzed within several days at this temperature and pH 8.

EXAMPLE 8

Cross-linking corn starch with sodium metaphosphate.

A sample of commercial sodium metaphosphate was found to be partially insoluble in water. About 60 percent of the sample dissolved. The dissolved portion which contained one gram of dry solids was included in the 324 ml. of make-up water in which 180 grams of corn starch was suspended. 6.66 grams of $Na_2CO_3$ was added and the final pH value of the starch slurry was 10.2. The slurry was stirred at 50° C. and periodically samples were removed, adjusted to pH 6.5 with HCl, filtered, washed in water and dried. Scott viscosities of these products are shown in Table VII.

Table VII

REACTION OF SODIUM METAPHOSPHATE WITH CORN STARCH (ONE GRAM/180 GRAMS) IN AQUEOUS SLURRY AT pH 10.2 AND 50° C.

| Reaction Time, Min. | Scott Viscosity, Sec./50 ml. | Clarity of 1% Pastes as Percent Light Transmission at λ=650 mμ |
|---|---|---|
| 0 (untreated) | 93 | 20 |
| 45 | 110 | |
| 60 | 139 | 21 |
| 75 | 146 | |
| 90 | 159 | 19 |
| 105 | 123 | |
| 120 | 104 | 18 |
| 180 | 55 | 16 |
| 240 | 29 | |
| 360 | 17 | 12.5 |

Comparing these results with those given in Table II, Example 2, where one gram of sodium trimetaphosphate was used per 180 grams of corn starch in aqueous slurry at pH 10.2 and 50° C., it is apparent that the action of sodium metaphosphate is comparable to that of sodium trimetaphosphate.

EXAMPLE 9

Cross-linking corn starch with sodium hexametaphosphate.

Corn starch was made into a slurry with a 10 percent aqueous solution of sodium hexametaphosphate that contained sufficient sodium hydroxide to give a pH value of 11.1 to the final reaction mixture. The aqueous suspension had a density corresponding to 22° Bé. at 30° C. The reaction mixture was stirred at 50° C. for 24 hours then cooled, adjusted from pH 11.0 to 6.5 with hydrochloric acid, filtered, thoroughly washed and dried.

The dried product when resuspended in water and heated for 15 minutes in a boiling water bath as in running the Scott viscosity by determination remained substantially ungelatinized.

This application is a division of application Serial No. 448,359, filed August 6, 1954 now U.S. Patent No. 2,801,242, issued July 30, 1957.

We claim:

1. A process for making an inert dusting powder which comprises treating unswollen granule starch in aqueous slurry with a water soluble salt from the group consisting of metaphosphates and polymetaphosphates in an amount within the range of about 0.01 to about 3.0 percent, based on the dry weight of the starch, at a temperature sufficiently low to maintain the starch in unswollen granule state, and for a time sufficient to esterify the starch to the degree where it is substantially nongelatinizable in boiling water, the pH of the system being maintained within the range of about 9.0 to about 11.6, adding hydrochloric acid to lower the pH to about 6.5, then adding a water soluble calcium salt and washing and drying the resultant product.

2. The product produced in accordance with the process of claim 1.

References Cited in the file of this patent

UNITED STATES PATENTS

| | | |
|---|---|---|
| 2,009,692 | Hall | July 20, 1935 |
| 2,252,479 | Beyer | Aug. 12, 1941 |
| 2,575,352 | Lohmar | Nov. 20, 1951 |
| 2,626,257 | Caldwell et al. | Jan. 20, 1953 |
| 2,801,242 | Kerr et al. | July 30, 1957 |